United States Patent
Martínez Morales et al.

(10) Patent No.: US 10,643,803 B2
(45) Date of Patent: May 5, 2020

(54) METHODS FOR MANUFACTURING AN ELECTRICALLY INSULATING SUPPORT FOR AN ELECTROMECHANICAL SWITCH AND AN ELECTROMECHANICAL SWITCH, AND SUPPORT AND SWITCH MANUFACTURED ACCORDING TO THE METHODS

(71) Applicant: Álvaro Martínez Morales, Barcelona (ES)

(72) Inventors: Álvaro Martínez Morales, Barcelona (ES); Fernanado López Alacalá-Galiano, Barcelona (ES); Javier Berjaga Ferran, Sant Boi de Ilobregat (ES)

(73) Assignee: Álvaro Martínez Morales, Barcelona (ES)

( * ) Notice: Subject to any disclaimer, the term of this patent is extended or adjusted under 35 U.S.C. 154(b) by 182 days.

(21) Appl. No.: 15/223,856

(22) Filed: Jul. 29, 2016

(65) Prior Publication Data
US 2017/0032903 A1    Feb. 2, 2017

(30) Foreign Application Priority Data
Jul. 31, 2015   (EP) .................................... 15382404

(51) Int. Cl.
*H01H 9/02* (2006.01)
*B29C 45/16* (2006.01)
(Continued)

(52) U.S. Cl.
CPC ............. *H01H 9/02* (2013.01); *B29C 45/164* (2013.01); *B29C 45/1643* (2013.01); *H01H 11/00* (2013.01); *B29L 2031/3443* (2013.01)

(58) Field of Classification Search
CPC ......... H01H 9/02; H01H 11/00; B29C 45/164
(Continued)

(56) References Cited

U.S. PATENT DOCUMENTS 5,153,399 A    10/1992  Schaffer et al.
5,489,754 A *   2/1996  Dirmeyer ........... G07C 9/00944
                                                    200/302.1
(Continued)

FOREIGN PATENT DOCUMENTS

EP    1 445 087 A1    8/2004
EP    3 124 198 B1    9/2018
(Continued)

OTHER PUBLICATIONS

Communication of extended European search report for Eupropean Patent Application No. 15382404.0 (dated Jan. 8, 2016).
(Continued)

*Primary Examiner* — Edwin A. Leon
*Assistant Examiner* — Iman Malakooti
(74) *Attorney, Agent, or Firm* — Jenkins, Wilson, Taylor & Hunt, P.A.

(57) ABSTRACT

Provided is a method for manufacturing an electrically insulating support for an electromechanical switch. In some embodiments, the presently disclosed method includes manufacturing at least first and second portions of the support with respectively first and second plastics having different temperature heat resistances and manufacturing the support as a single piece by at least one of an overmolding process and a multi-material injection process. In some embodiments, the electrically insulating support is manufactured according to the method for manufacturing an electrically insulating support. Also provided is a method for manufacturing an electromechanical switch, which in some embodiments includes manufacturing an electrically insu-
(Continued)

lating support according to the presently disclosed method for manufacturing an electrically insulating support and attaching electrically conductive elements to different regions thereof. Also provided is an electromechanical switch manufactured according to the presently disclosed method.

7 Claims, 13 Drawing Sheets

(51) Int. Cl.
*H01H 11/00* (2006.01)
*B29L 31/34* (2006.01)

(58) Field of Classification Search
USPC .......................................................... 200/293
See application file for complete search history.

(56) References Cited

U.S. PATENT DOCUMENTS

| | | | |
|---|---|---|---|
| 5,893,959 A * | 4/1999 | Muellich | ............. B29C 65/1635 156/272.8 |
| 6,093,353 A | 7/2000 | O'Brien | |
| 6,750,407 B2 | 6/2004 | Song et al. | |
| 7,852,180 B2 | 12/2010 | Gentsch et al. | |
| 2006/0049030 A1 * | 3/2006 | Grems | .................... B29C 45/16 200/333 |
| 2008/0142485 A1 * | 6/2008 | Gentsch | ............ B29C 45/14639 218/118 |
| 2011/0024275 A1 | 2/2011 | Aisenbrey | |

FOREIGN PATENT DOCUMENTS

| | | |
|---|---|---|
| WO | WO 1999/060315 A1 | 5/1992 |
| WO | WO 2003/044816 A1 | 5/2003 |

OTHER PUBLICATIONS

Communication under Rule 71(3) EPC for European Patent Application No. 15382404.0 (dated Apr. 4, 2018).
Communication Pursuant to Article 94(3) EPC for European Patent Application No. 15382404.0 (dated Aug. 25, 2017).
Decision to Grant a European Patent for European Patent Application No. 15382404.0 (dated Aug. 23, 2018).

* cited by examiner

METHODS FOR MANUFACTURING AN ELECTRICALLY INSULATING SUPPORT FOR AN ELECTROMECHANICAL SWITCH AND AN ELECTROMECHANICAL SWITCH, AND SUPPORT AND SWITCH MANUFACTURED ACCORDING TO THE METHODS

CROSS REFERENCE TO RELATED APPLICATION

This application claims the benefit of European Patent Application EP15382404, filed Jul. 31, 2015, the disclosure of which is incorporated by reference herein in its entirety

TECHNICAL FIELD

The present invention generally concerns, in a first aspect, to a method for manufacturing an electrically insulating support for an electromechanical switch, comprising manufacturing different portions with plastics having different temperature heat resistances, and more particularly to a method comprising manufacturing the support as a single piece by at least an overmolding process and/or a multi-material injection process.

A second aspect of the invention concerns to a method for manufacturing an electromechanical switch, comprising manufacturing an electrically insulating support according to the method of the first aspect of the invention and attaching electrically conductive elements to different regions thereof.

A third aspect of the invention relates to an electrically insulating support manufactured according to the method of the first aspect of the invention.

A fourth aspect of the invention concerns to an electromechanical switch manufactured according to the method of the third aspect of the invention.

BACKGROUND

Different electrically insulating supports for electromechanical switches and methods for their manufacturing are known in the art.

Some of them comprises manufacturing the entire body of the support from only one insulating material, generally a plastic, while other combine different types of plastic, such as thermoplastics, into the same support.

One of said proposals is disclosed in International Application WO9960315, which describes a support comprising two different types of thermoplastics: one of which is electrically insulating and the other one is electrically conductive.

EP751865B1 discloses a housing for an electrical switch and a method for its manufacturing, where the housing is made from to thermoplastic components which are welded to one another. The thermoplastic components have different transmission and absorption coefficients for the spectrum of a laser beam, in order allow the laser welding.

Some low and medium voltage applications, such as the ones associated to electrical circuits of a household electrical appliance (such as an oven) require the use of electromechanical switches having electrically insulating supports with portions withstanding different temperatures. These supports are conventionally manufactured from only one material, such as a thermosetting material, selected to withstand the highest possible temperature, thus increasing the cost of such a support.

None of the above mentioned patent documents discloses selecting the different thermoplastic components to have different temperature heat resistances.

However, there is a patent document which discloses such a thermoplastics selection based on temperature heat resistance criteria. Said patent document is EP0484747, which discloses a puffer switch, for high voltage applications, comprising a rotor assembly inserted into a shell secured between a pair of stationary contact supports, where depending on the temperature to withstand some parts are made from a high or a low cost thermoplastic or from a thermosetting plastic.

EP0484747 does not disclose different portions of the same part being formed from different plastics having different temperature heat resistances, nor to manufacture the entire switch support into only one piece made of different plastics having different temperature heat resistances.

It is, therefore, necessary to provide an alternative to the state of the art which covers the gaps found therein.

SUMMARY

To that end, the present invention relates, in a first aspect, to a method for manufacturing an electrically insulating support for an electromechanical switch, comprising:

selecting and providing a first plastic having a first temperature heat resistance and a second plastic having a second temperature heat resistance, said first temperature heat resistance being higher than said second temperature heat resistance, wherein at least said second plastic is a thermoplastic; and manufacturing at least first and second portions of the electrically insulating support with respectively said first and second provided plastics.

Contrary to the known methods, particularly contrary to the method used for manufacturing the high voltage switch support disclosed in EP0484747, the method of the first aspect of the invention comprises, in a characteristic manner, manufacturing the electrically insulating support as a single piece by at least one of:

an overmolding process, comprising manufacturing at least said first portion and then manufacturing at least said second portion by overmolding at least some regions of said first portion with at least said second plastic, or vice versa; and a multi-material injection process, comprising simultaneously manufacturing and joining at least said first and second portions, and/or other portions of the electrically insulating support also having different temperature heat resistances.

Depending on the embodiment, the first plastic is also a thermoplastic or a thermosetting plastic.

For an embodiment, the cited manufacturing of said portions comprises performing the above mentioned plastics selection and configuring, sizing and arranging said portions with respect to each other, at least by selecting the size and shape of moulds used for said overmolding and/or multi-material injection processes, based on thermal conduction heat transfer criteria.

For an embodiment, said multi-material injection process is a multi-material co-injection process.

The method of the first aspect of the invention comprises, for an embodiment, selecting said second plastic to withstand at least the highest temperature value reached at a joining region of the second portion with the first portion, said highest temperature value being calculated using said thermal conduction heat transfer criteria.

For an embodiment, the method of the first aspect of the invention comprises selecting the first and the second plastics based on chemical bonding affinity criteria. For this embodiment, none of the plastics is a thermosetting plastic, as that kind of plastics cannot be chemically bonded.

According to an embodiment, the method of the first aspect of the invention comprises chemically bonding and/or mechanically bonding the cited portions of the electrically insulating support.

For another embodiment, the method of the first aspect comprises selecting and providing a third plastic having a third temperature heat resistance higher than said second temperature heat resistance, and manufacturing the electrically insulating support as a single piece including a third portion made with said third plastic into said overmolding and/or injection process.

Depending on the embodiment, the third temperature heat resistance of the third plastic is lower, equal or higher than the first temperature heat resistance.

A second aspect of the invention relates to a method for manufacturing an electromechanical switch, comprising:
  manufacturing an electrically insulating support according to the method of the first aspect of the invention;
  providing at least a first, a second and a third electrically conductive elements configured and arranged such that the third electrically conductive element selectively connects the first and second electrically conductive elements; and
  attaching the first and the second electrically conductive elements respectively to:
    two separated regions of said first portion, or
    one to the first portion and the other to a third portion made of a plastic having a third temperature heat resistance higher than the second temperature heat resistance, said first and third portions being distanced by the second portion.

As stated above, depending on the embodiment, the third temperature heat resistance of the third plastic is lower, equal or higher than the first temperature heat resistance. This is useful, for example, for manufacturing a switch where, although both the first and the third portions are attached to respective electrically conductive elements and, therefore, in use, submitted to the heating caused by the circulation of electrical current there through, one of said first and third portions is submitted to a lower ambient temperature than the other one, for example because it is placed in a refrigerating chamber. Thus, said refrigerated portion does not need to withstand the same high temperature than the other one, and can, therefore, be made of a plastic having a lower temperature heat resistance.

A third aspect of the invention concerns to an electrically insulating support for an electromechanical switch, manufactured as a single piece according to the method of the first aspect of the invention.

For an embodiment, the electrically insulating support of the third aspect of the invention is manufactured according to the above described embodiment of the method of the first aspect comprising manufacturing the electrically insulating support as a single piece including a third portion made with a third plastic, wherein the first and third portions are distanced by the second portion.

A fourth aspect of the invention relates to an electromechanical switch manufactured according to the method of the second aspect of the invention.

For an embodiment, the electromechanical switch of the fourth aspect of the invention is configured, arranged and adapted for low or medium voltage applications.

According to another embodiment, the electromechanical switch is configured, arranged and adapted for withstanding a high number of switching actions per use of the electrical circuit into which is interconnected. For a variant of said embodiment, said electrical circuit is a thermostat.

For a further embodiment, the electromechanical switch is configured, arranged and adapted for being connected into an electrical circuit of a household electrical appliance, such as an oven.

Generally, but not exclusively, the electromechanical switch of the fourth aspect of the invention is a manual switch.

For another embodiment, the electromechanical switch of the fourth aspect of the invention is an automatic switch.

BRIEF DESCRIPTION OF THE DRAWINGS

The previous and other advantages and features will be more fully understood from the following detailed description of embodiments, with reference to the attached drawings, which must be considered in an illustrative and non-limiting manner, in which.

DETAILED DESCRIPTION

The appended Figures show different embodiments of the one-piece electrically insulating support and of the electromechanical switch of the present invention, from simple designs to more elaborated ones, as described below.

Figure 1A:
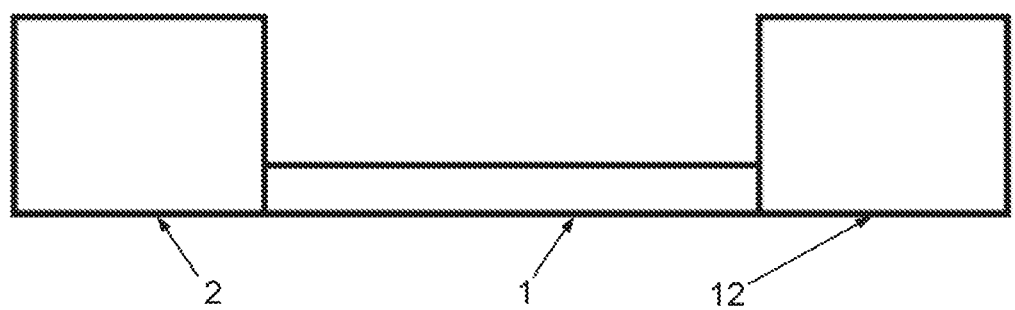
FIGS. 1A and 1B are respectively a side view and a perspective view of the electrically insulating support of the third aspect of the invention, for an embodiment.
Figure 1B:
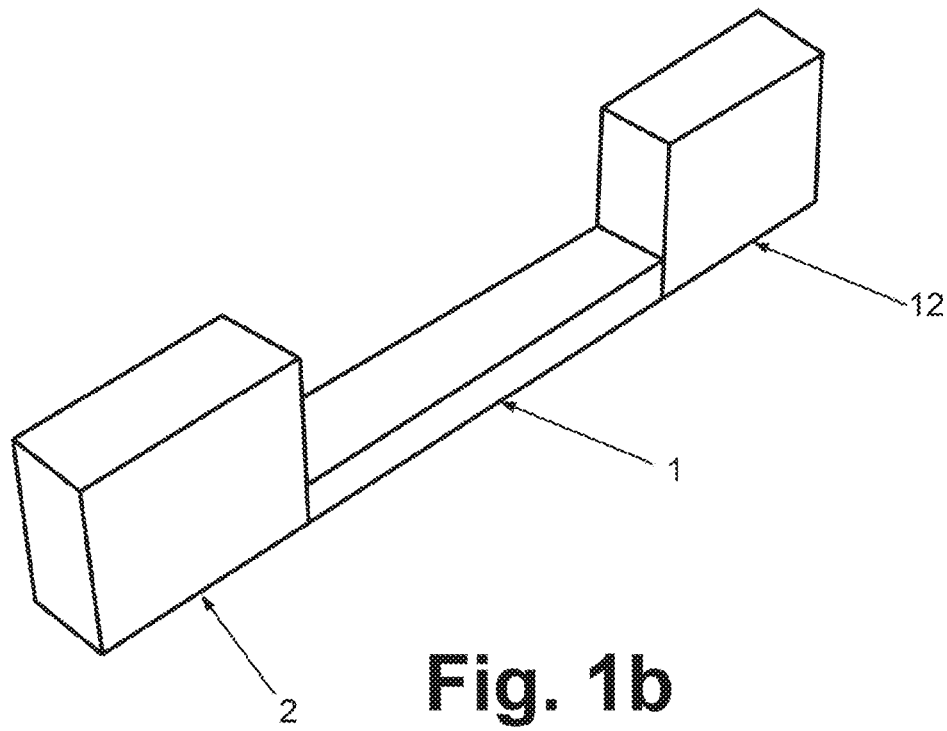

Particularly, FIGS. 1A and 1B show a simple electrically insulating support comprising three portions: a first portion 2, a second portion 1, and a third portion 12, where the second portion 1 is arranged between the other two portions 2 and 12 and has a lower temperature heat resistance, but high enough to withstand the temperature to be present at the joining regions with portions 2 and 12, which is estimated based on thermal conduction heat transfer criteria.

Figure 2A:
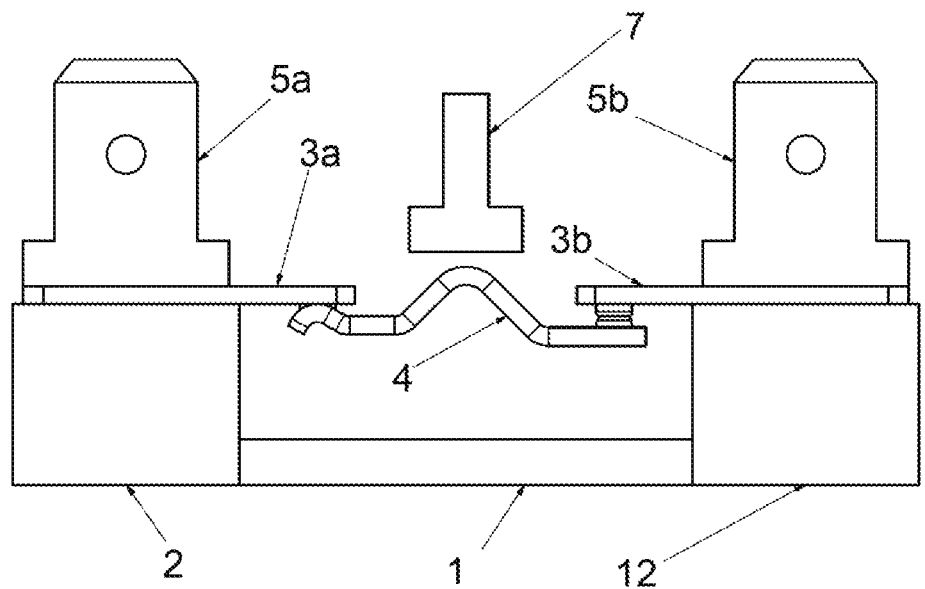
FIGS. 2A and 2B are respectively a side view and a perspective view of the electromechanical switch of the fourth aspect of the invention, for an embodiment, including the support of FIGS. 1A and 1B.
Figure 2B:
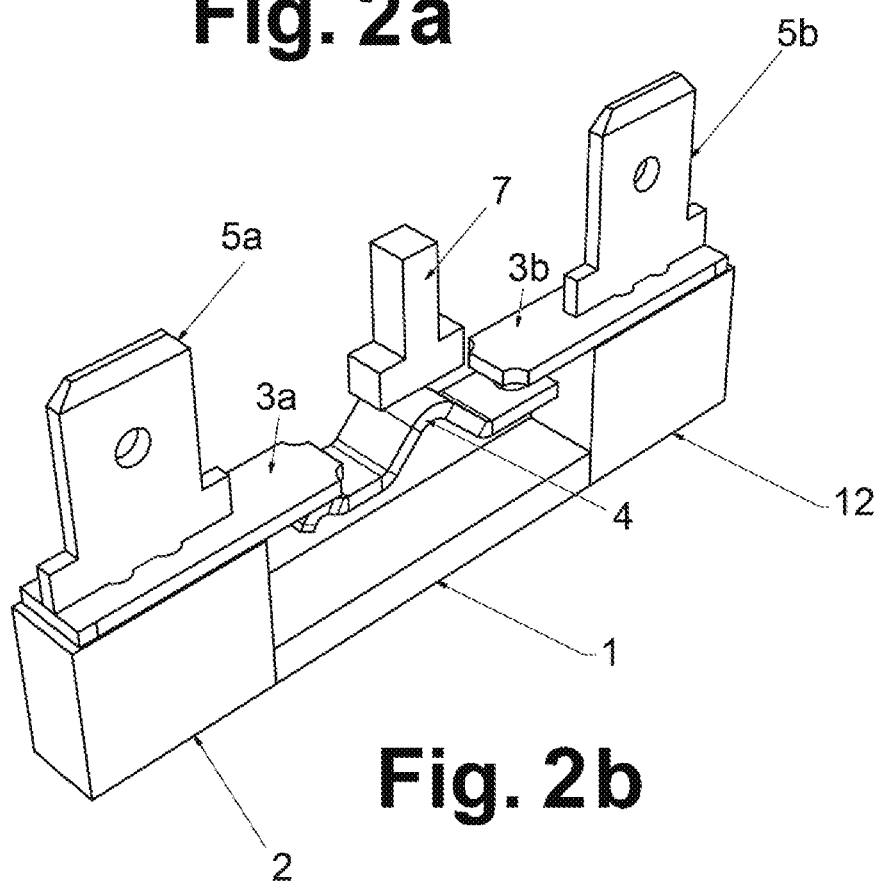
Figure 3A:
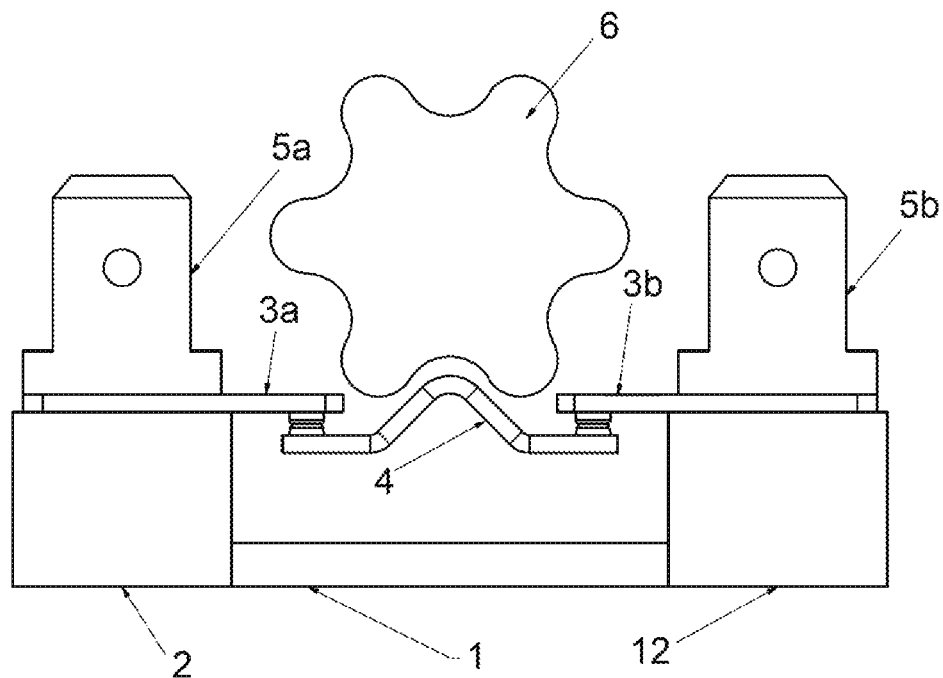
FIGS. 3A and 3B are respectively a side view and a perspective view of the electromechanical switch of the fourth aspect of the invention, for another embodiment, including also the support of FIGS. 1A and 1B.
Figure 3B:
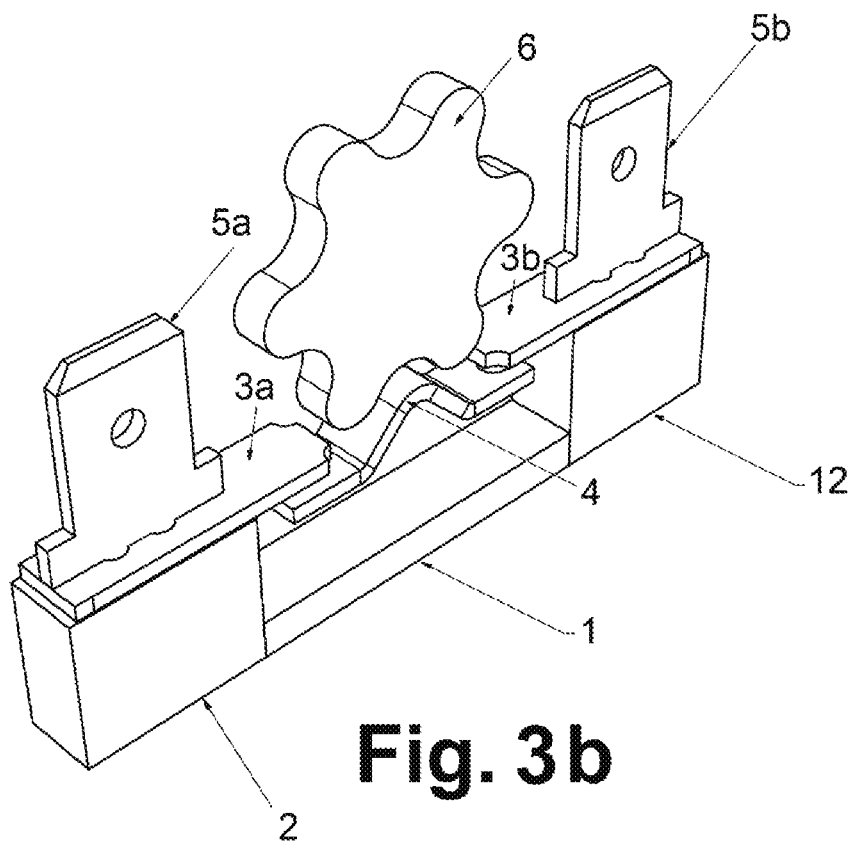

FIGS. 2A, 2B, 3A, and 3B show two different embodiments of the electromechanical switch of the fourth aspect of the invention, both including the support of FIGS. 1A and 1B, where two metallic terminals 5a and 5b are respectively attached to first 2 and third 12 portions, contacting and trapping respective metallic plates 3a and 3b which are selectively connected to one another through a movable metallic bridge 4, upon the orthogonal actuation of vertical actuator 7, for the embodiment of FIGS. 2A, 2B, or rotatory actuator 6, for the embodiment of FIGS. 3A and 3B. For the embodiment of FIGS. 2A and 2B only one end of the metallic bridge 4 is movable, particularly that contacting metallic plate 3b, while for the embodiment of FIGS. 3A and 3B both ends of the metallic bridge 4 are movable.

Figure 12A:
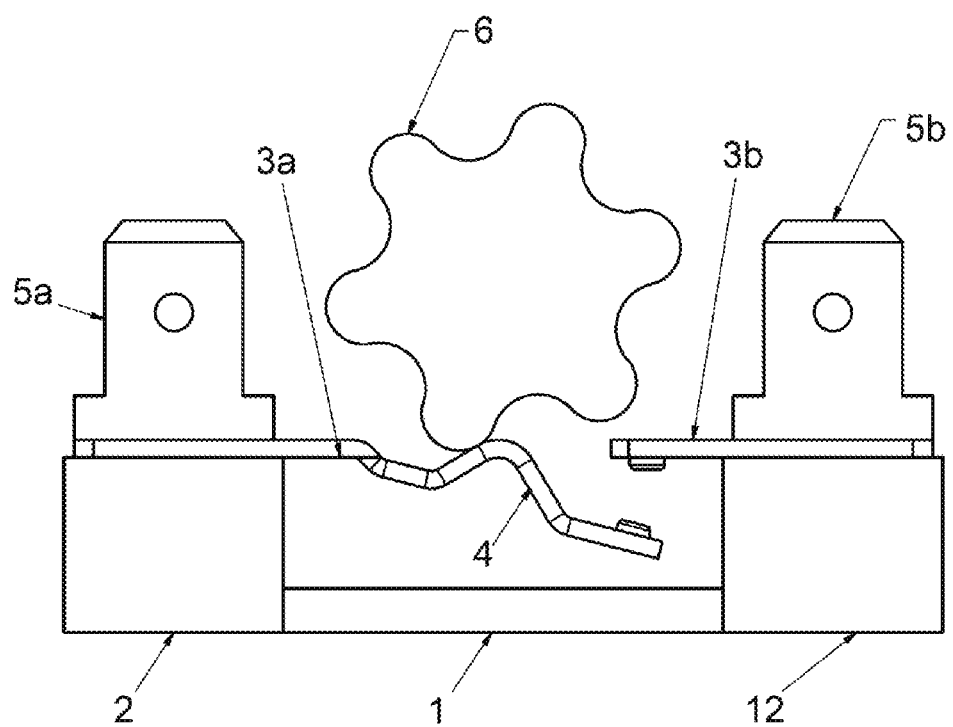
FIGS. 12A and 12B are respectively a side view and a perspective view of the electromechanical switch of the fourth aspect of the invention, for another embodiment, similar to the one of FIGS. 3A and 3B, but for a metallic bridge constituting a flexible switching element.
Figure 12B:
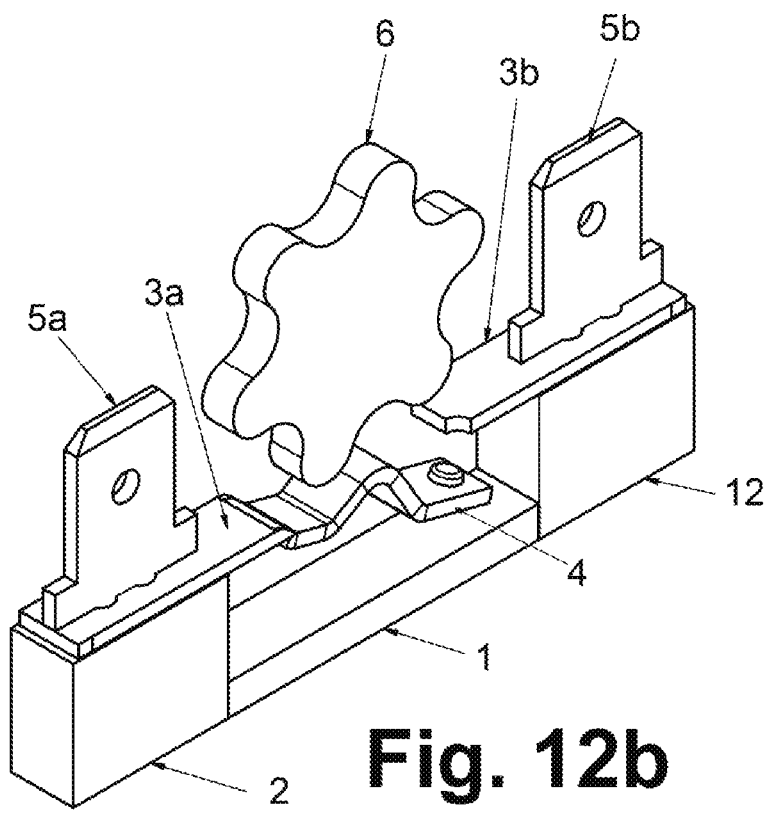

FIGS. 12A and 12B show another embodiment of the electromechanical switch of the fourth aspect of the invention, which differs from the one of FIGS. 3A and 3B in that metallic plate 3a and metallic bridge 4 are two respective portions of the same element or two elements joined by an elastic material, in both cases the metallic bridge 4 being movable with respect to the metallic plate 3a in an elastic manner, thus constituting a flexible switching element.

The configuration, sizing, and arranging of portions 1, 2, and 12, with respect to each other, is selected based on thermal conduction heat transfer criteria. In other words, the heat distribution (in magnitude and direction) from the hottest points of portions 2 and 12, i.e. those in contact with the metallic elements, towards portion 1 is estimated and taken into account in the design stage in order to determine the dimensions (thickness, width, length) and spatial arrangement for each of the portions 1, 2, and 12. The plastics selection for each of the portions 1, 2, and 12 is also based on said estimated heat distribution. At the end of this section, this design stage is further developed in a generic manner.

Figure 4A:
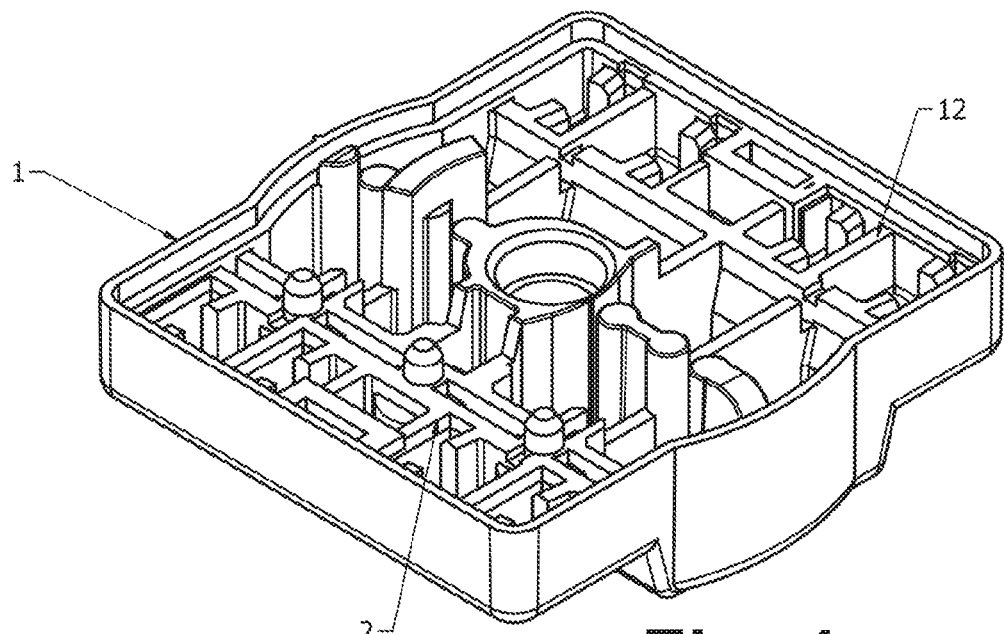
FIGS. 4A and 4B are respective top and a bottom perspective views of the electrically insulating support of the third aspect of the invention, for another embodiment.
Figure 4B:
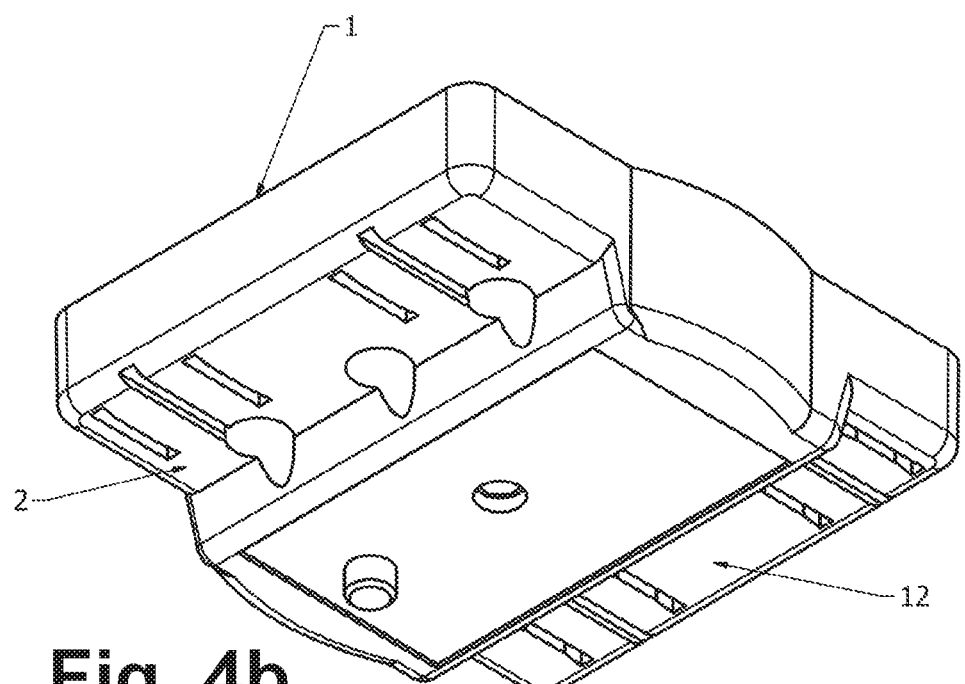

A further embodiment is shown in FIGS. 4A and 4B for the electrically insulating support of the third aspect of the invention, which in this case is intended for providing four switchable electrical paths, and where portion 1 includes a central region acting as bridge between portions 2 and 12, and also a frame region laterally surrounding said portions 2 and 12.

Figure 5A:
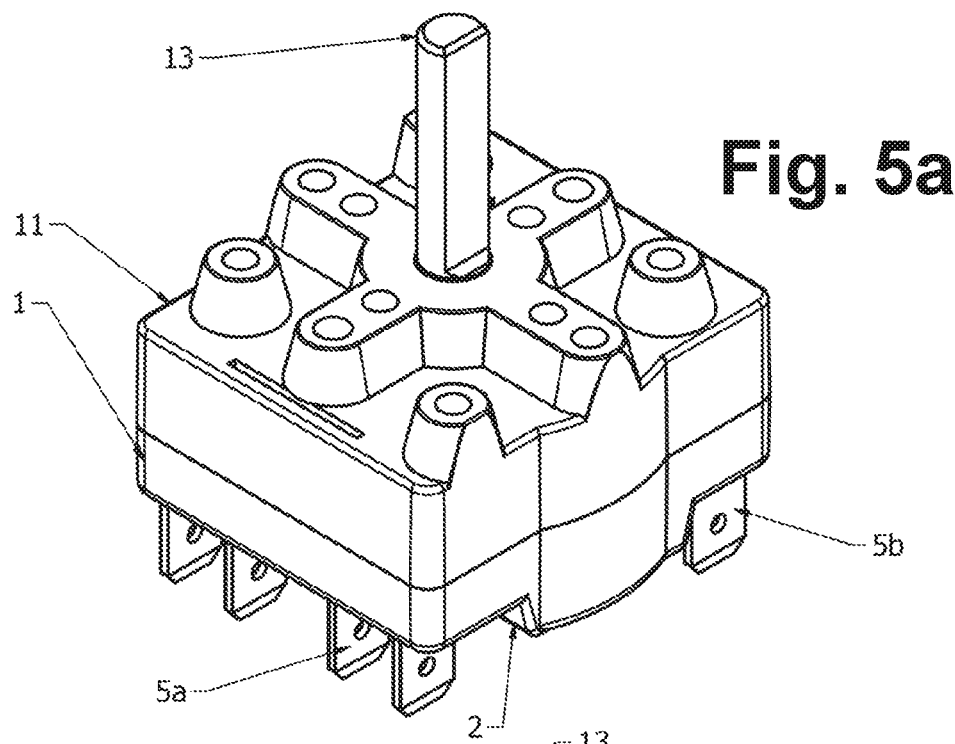
FIGS. 5A and 5B are respective top and a bottom perspective views of the electromechanical switch of the fourth aspect of the invention, for an embodiment, including the support of FIGS. 4A and 4B.
Figure 5B:
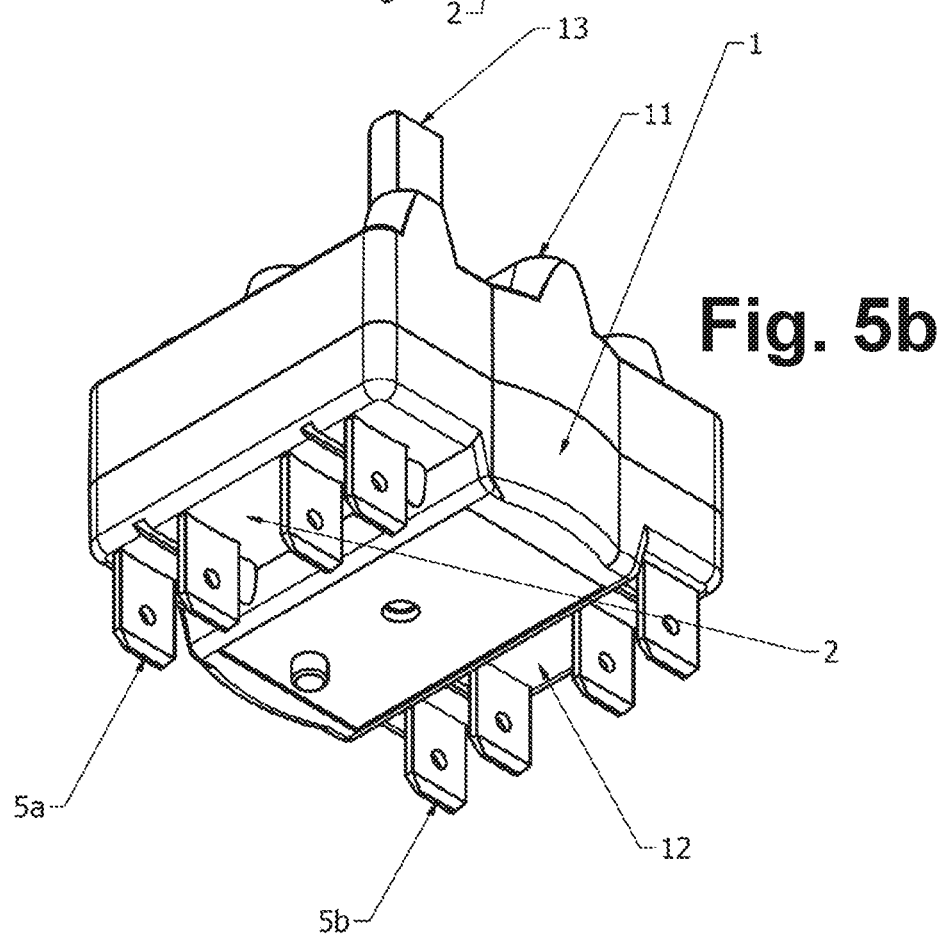

FIGS. 5A and 5B show an embodiment of the electromechanical switch of the fourth aspect of the invention, including the support of FIGS. 4A and 4B, where four metallic terminals 5a are attached to respective slots of first portion 2 forming a row and, opposed thereto, four further metallic terminals 5b are attached to respective slots of third portion 12 also forming a row. Terminals 5a are selectively connected to terminals 5b through respective movable metallic bridges (not shown) upon the rotation of actuation shaft 13 which can be made of a plastic having a high temperature heat resistance. A cover 11 is coupled to the support, preferably made of a high temperature heat resistance material, such as the same than portion 1.

Figure 6A:
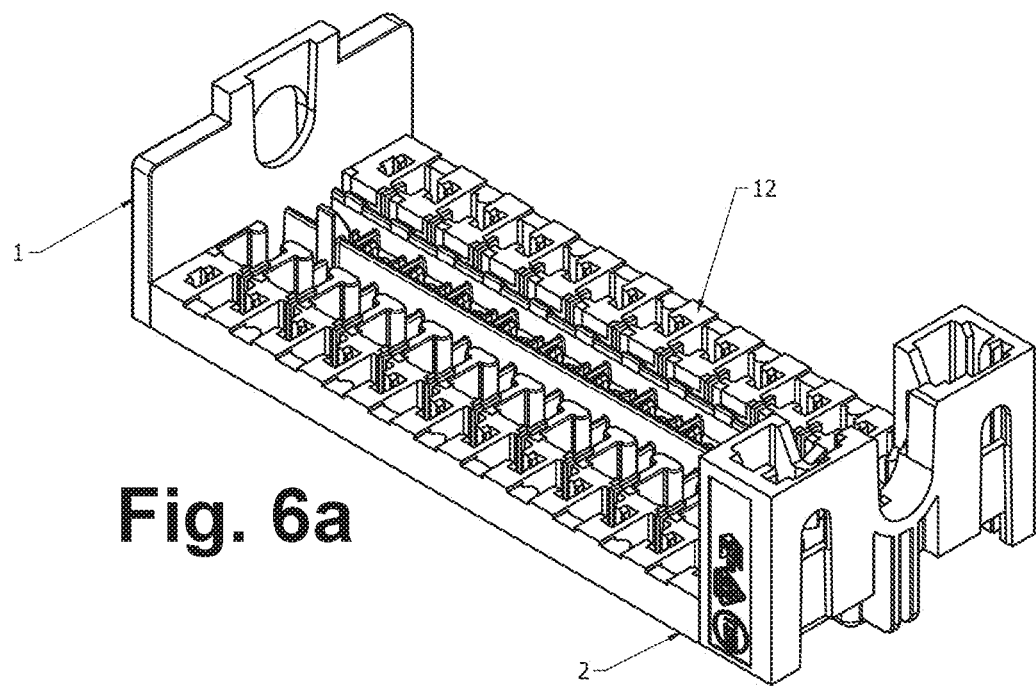
FIGS. 6A and 6B are respective top and bottom perspective views of the electrically insulating support of the third aspect of the invention, for a further embodiment.
Figure 6B:
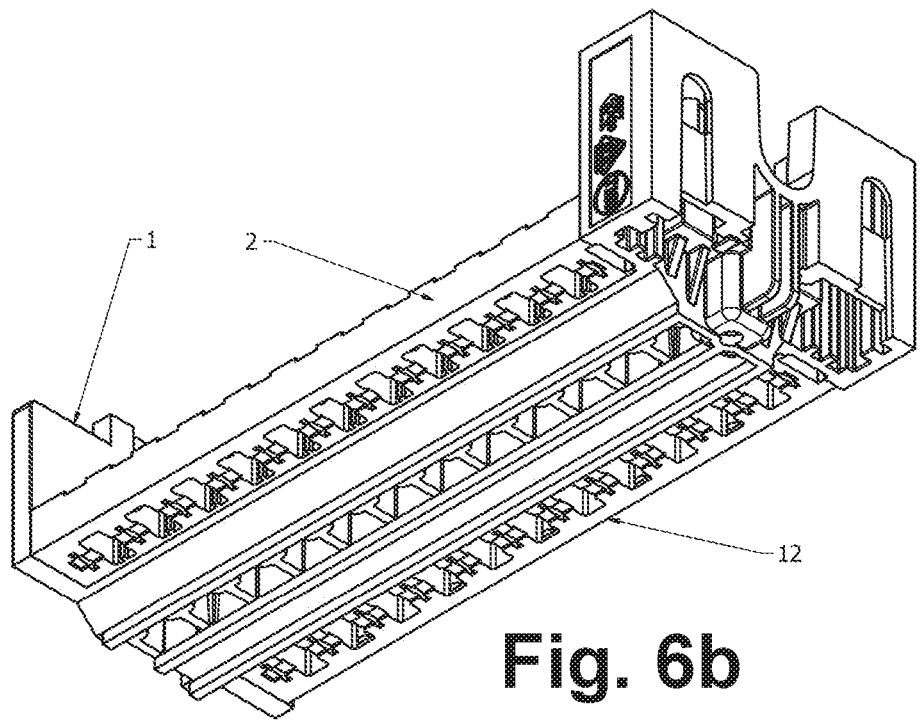

FIGS. 6A and 6B show a further embodiment for the electrically insulating support of the third aspect of the invention, which in this case is intended for providing twelve switchable electrical paths, and where portion 1 includes a central region acting as bridge between portions 2 and 12, and also two raised end walls abutting on the respective ends of portions 2 and 12.

Figure 7A:
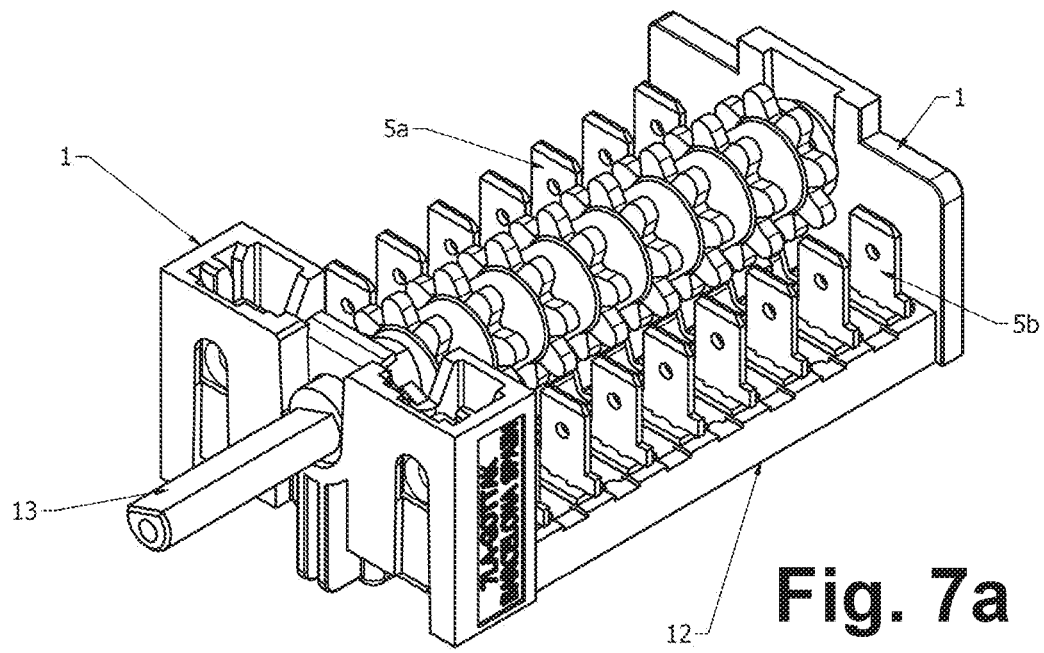
FIGS. 7A and 7B are respective top and a bottom perspective views of the electromechanical switch of the fourth aspect of the invention, for an embodiment, including a support similar to the one of FIGS. 6A and 6B.
Figure 7B:
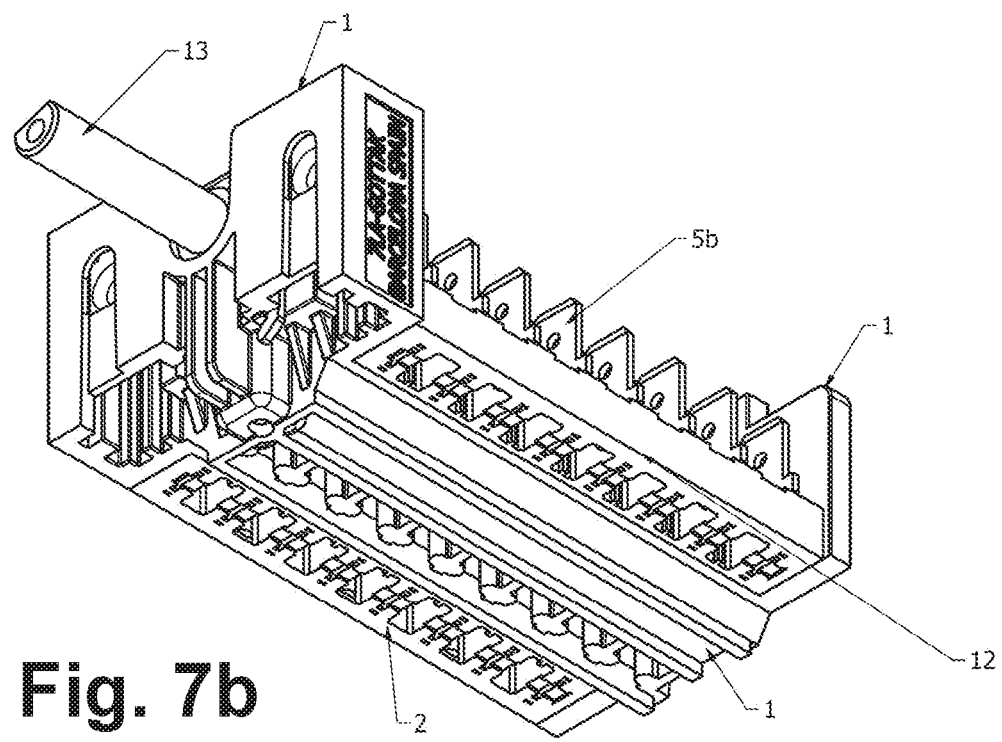

FIGS. 7A and 7B show an embodiment of the electromechanical switch of the fourth aspect of the invention, including a support similar to the one of FIGS. 6A and 6B, but in this case intended for providing eight switchable electrical paths, where eight metallic terminals 5a are attached to respective slots of first portion 2 forming a row and, opposed thereto, eight further metallic terminals 5b are attached to respective slots of third portion 12 also forming a row. Terminals 5a are selectively connected to terminals 5b through respective movable metallic bridges (not shown) upon the actuation of plastic discs arranged about a horizontal shaft, together forming a cam, guided on the two raised end walls of portion 1 and having a shaft actuation end 13 to rotate the horizontal shaft and thus perform the closing/opening of the electrical paths.

Figure 8A:
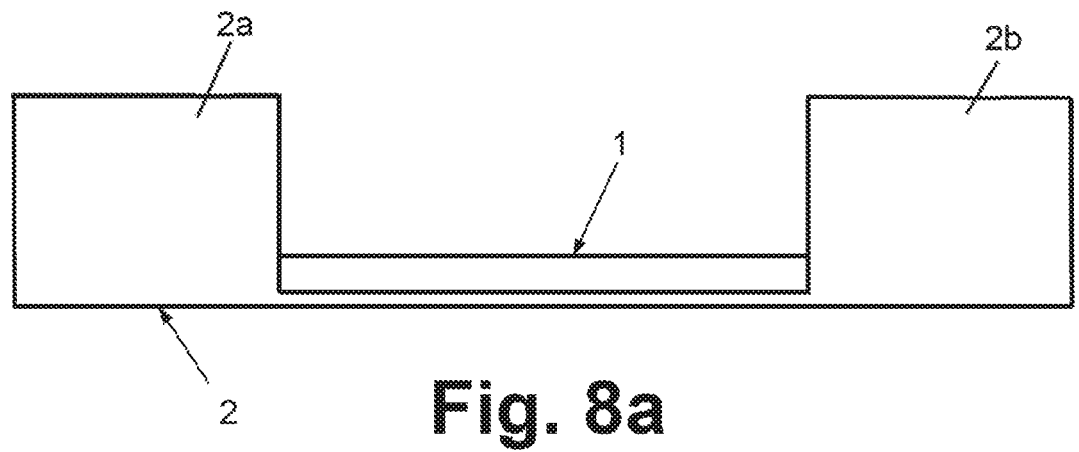
FIGS. 8A and 8B are respectively a side view and a perspective view of the electrically insulating support of the third aspect of the invention, for an embodiment which differs from the one shown in FIGS. 1A and 1B in that only two plastic portions are included in the support.
Figure 8B:
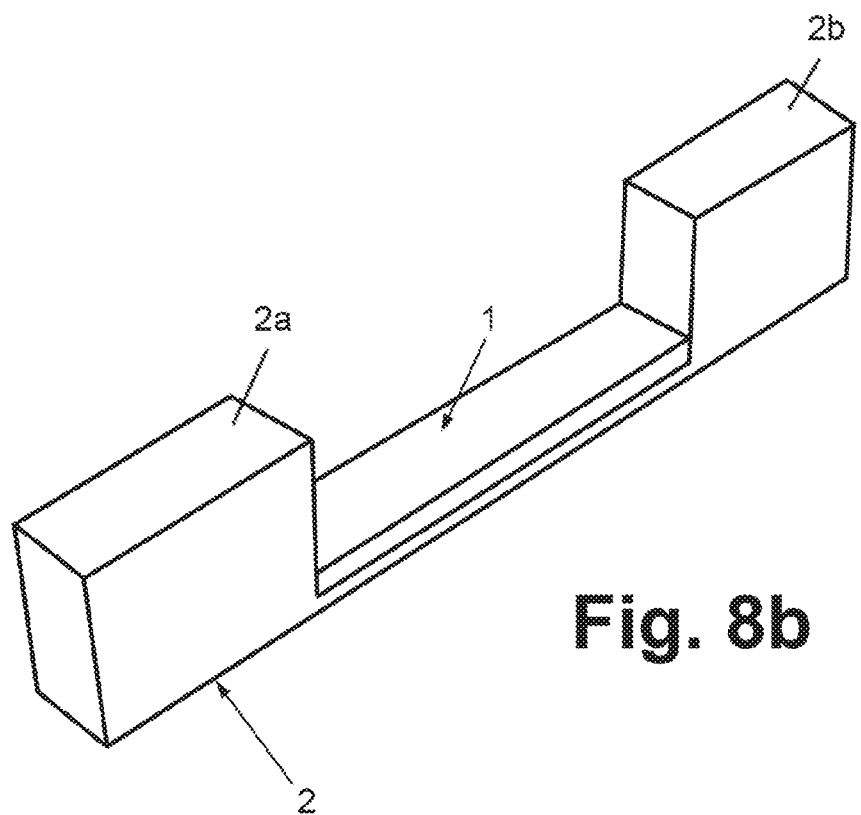

FIGS. 8A and 8B show a further embodiment of the electrically insulating support of the third aspect of the invention, for an embodiment which differs from the one shown in FIGS. 1A and 1B in that only two plastic portions are included in the support, particularly a first portion 2 and a second portion 1, where the second portion 1 has a lower temperature heat resistance and is arranged between two separated regions 2a and 2b of portion 2. Electromechanical switches similar to the ones of FIGS. 2A, 2B, 3A, and 3B are obtained by substituting the support of FIGS. 1A and 1b with the one of FIGS. 8A and 8B, where the two metallic terminals 5a and 5b are, in this case, respectively attached to the two separated regions 2a and 2b of the first portion 2.

Figure 10A:
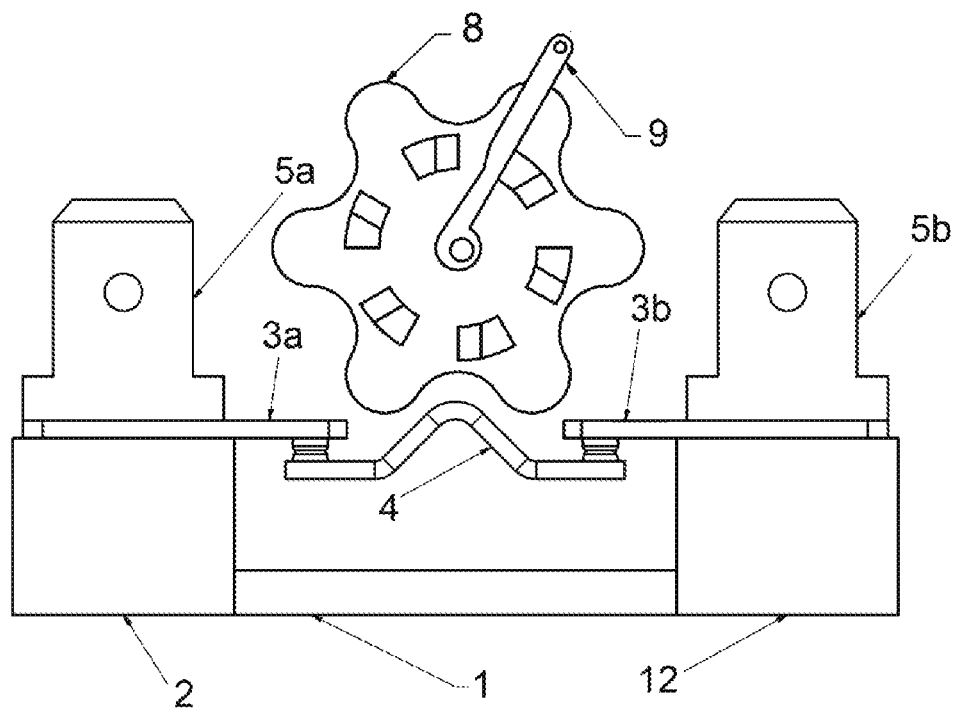
FIGS. 10A and 10B are respectively a side view and a perspective view of the electromechanical switch of the fourth aspect of the invention, for another embodiment, including also the support of FIGS. 1A and 1B, constituting a toggle actuator switch.
Figure 10B:
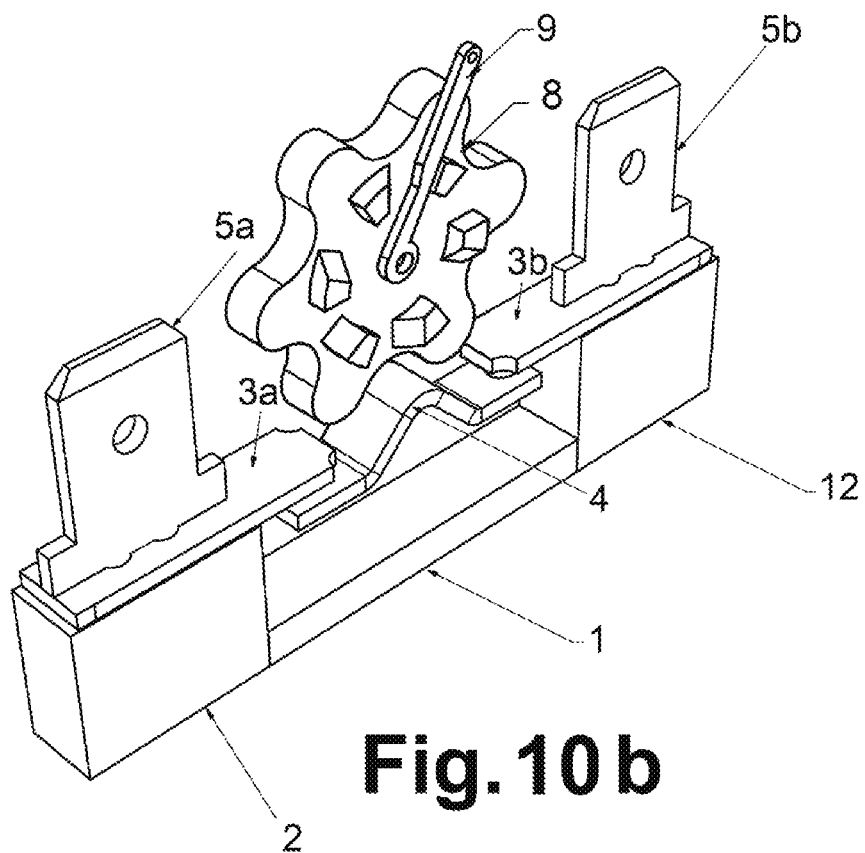

FIGS. 10A and 10B show another embodiment of the electromechanical switch of the fourth aspect of the invention, which differs from the one of FIGS. 3A and 3B in that it constitutes a toggle actuator switch, where the actuator is a toggle actuator including a rotary actuator 8 with several protrusions distributed in circle along one of its major faces and an actuator lever 9 arranged to move between the protrusions and displace the rotary actuator by pushing a corresponding protrusion.

Figure 11:
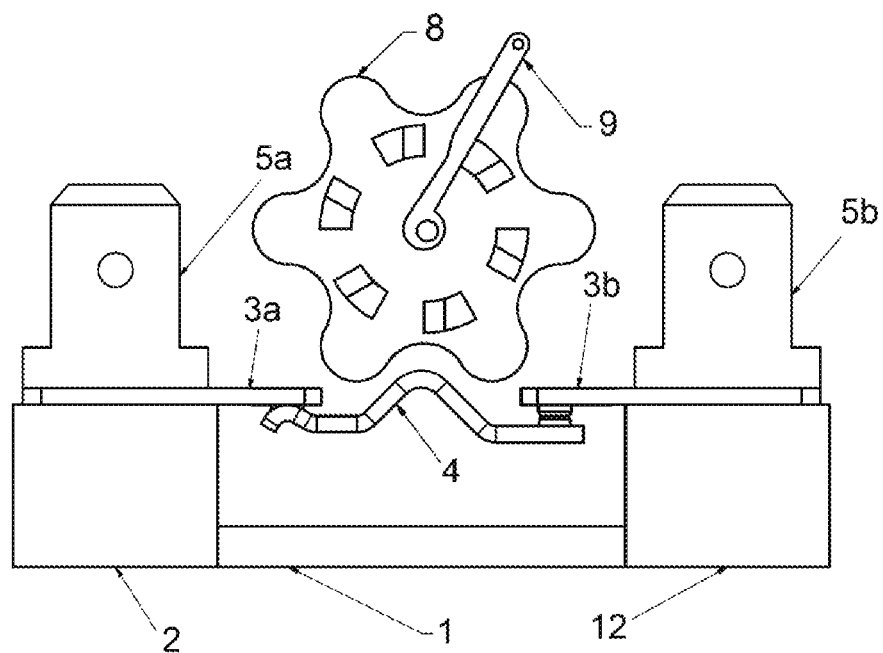
FIGS. 11A and 11B are respectively a side view and a perspective view of the electromechanical switch of the fourth aspect of the invention, for another embodiment, including also the support of FIGS. 1A and 1B and also constituting a toggle actuator switch, slightly different to the one of FIGS. 10A and 10B.
Figure 11:
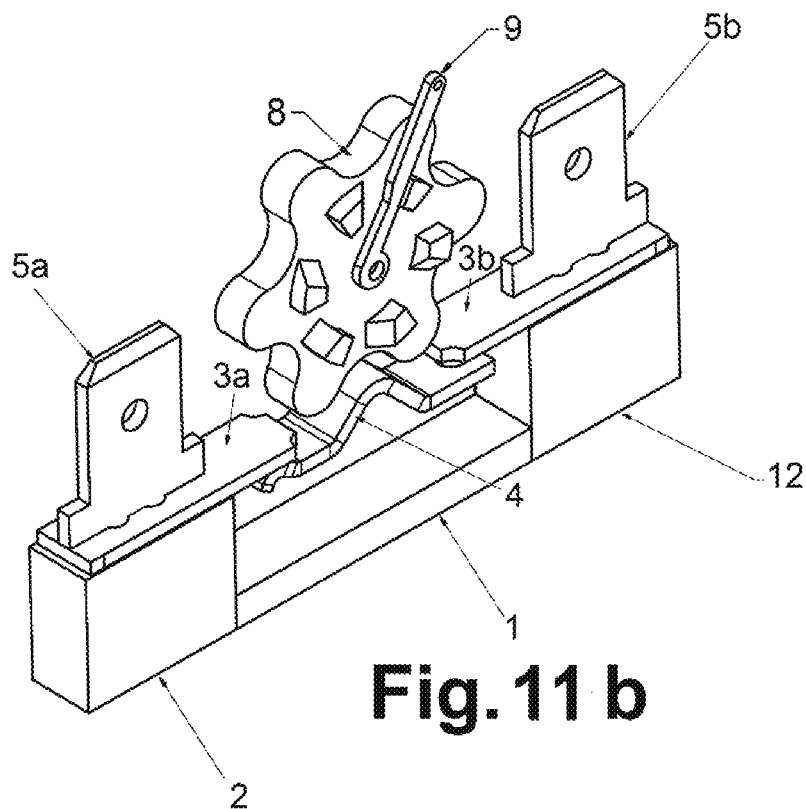

The embodiment of FIGS. 11A and 11B differs from the one of FIGS. 10A and 10B in that only one end of the metallic bridge 4 is movable, particularly that contacting metallic plate 3b.

Figure 13A:
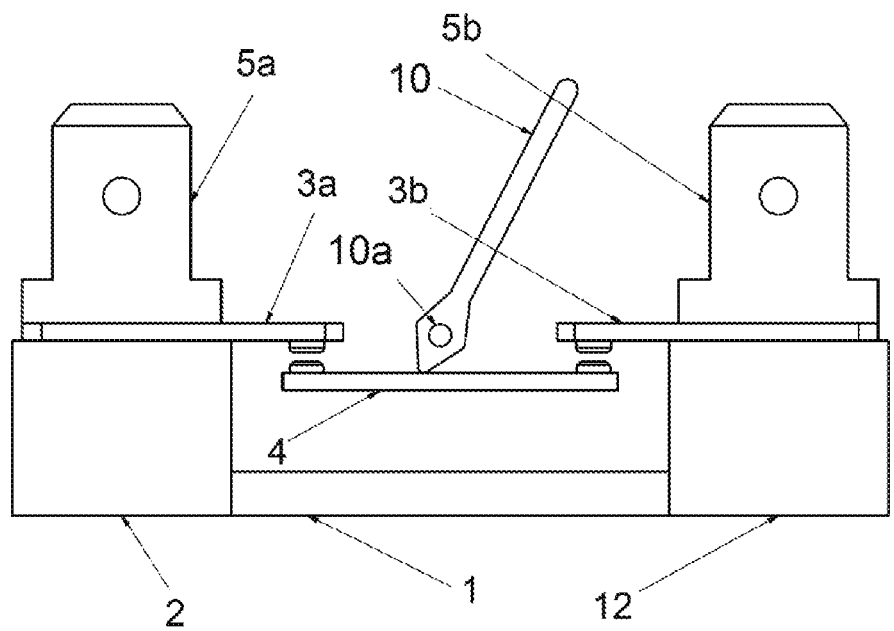
FIGS. 13A and 13B show a further embodiment of the electromechanical switch of the fourth aspect of the invention, by means of a side view and a perspective view, where the switch constitutes a rocker switch.
Figure 13B:
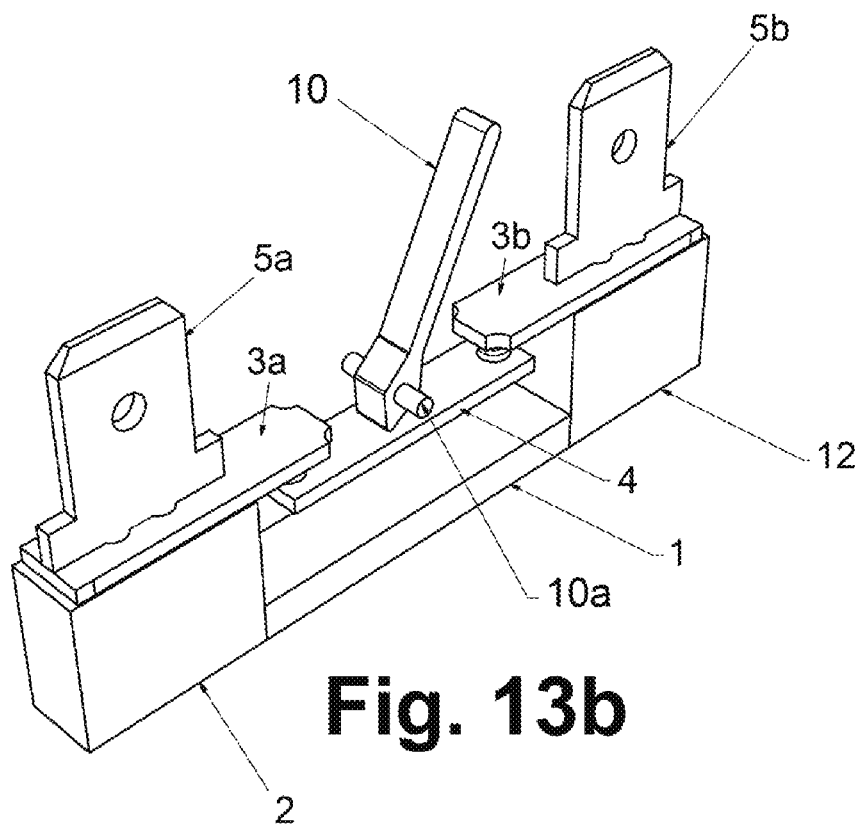

A further embodiment for the electromechanical switch of the fourth aspect of the invention is shown in FIGS. 13A and 13B, which constitutes a rocker switch, where a lever 10 is pivotable about a shaft 10a to actuate a flat metallic bridge 4 through a lower end of the lever 10.

Next, the above mentioned design stage based on the heat distribution and relationship with the characteristics of the plastics materials to be selected, is broadly described.

Generally in the case of normal operation, the temperatures that occur due to the circulation of current through the global resistance of an elementary switching circuit are within temperatures assumable by normal thermoplastics, such as polyamides, though relatively close to their limits when the ambient temperature of the specific application reaches values up to 150° C. which is, therefore, added to the temperature generated by said current circulation.

However in certain circumstances certain phenomena can occur which can adversely affect the performance of the switching circuit such as, for example, increases in electrical resistance due, for example, to deficient external connections, or the electrical arc phenomena that occur at the circuit opening times. Arc phenomena are of extraordinary complexity, but always causes high currents of a very short duration, that often cause a cumulative deterioration effect.

All these effects of potential increase in temperature affect the switch circuit support and must be compensated with the use of suitable support materials.

In the case of the present invention, at least a bimaterial configuration, and generally a multimaterial configuration, is used, selecting the plastic with a higher temperature heat resistance for the region(s) which must withstand a higher temperature and plastics with a lower temperature heat resistance for the joining regions or in other regions which do not have to withstand with high temperatures.

For determining the geometry of these zones of different materials, i.e. for the above mentioned different portions 1, 2, and 12 of the support, an analysis has been conducted by the present inventors regarding temperature versus distance to the heat focus in order to know the temperature distribution curve and, therefore, its gradient, which is what finally determines the zones to be occupied by each of the different plastic, i.e. the dimensions of the different portions 1, 2, and 12 and also the boundaries between said zones.

Figure 9:
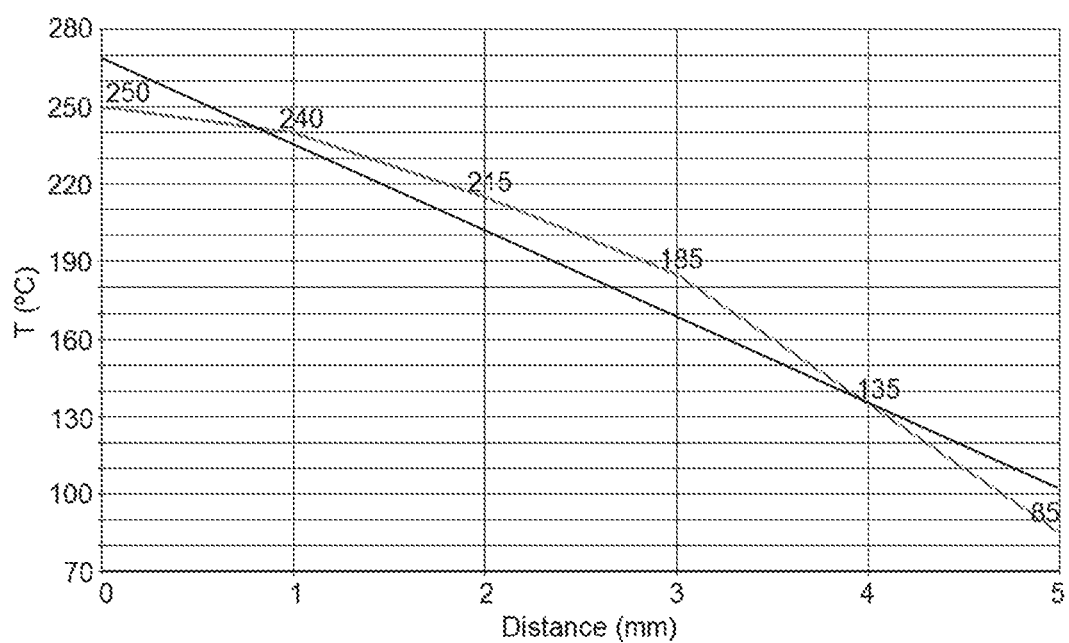
FIG. 9 is a graph showing the temperature distribution of the electrically insulating support of the third aspect of the invention, for an embodiment where the support is made of polyamide.

This temperature distribution analysis has been conducted on a support made of polyamide, and is represented in the graph of FIG. 9, where the thicker wave represents the measured values and the thinner wave represents the average profile thereof.

As shown, the temperature distribution profile responds approximately to a Gaussian curve profile (darker wave), which is to be expected given the analysed distances are relatively short and the support material (polyamide) is completely uniform in its characteristics.

They have been measured temperatures around 200° C. in cases of normal operation and up to 250° C. in conditions with some abnormality, such as conditions associated to a high number of switching actions and some deterioration of the material surface.

This temperature distribution gives an approximate gradient of temperature decreasing of about 30° C./mm. This value is used to establish the boundaries of the zones of different material, i.e. the boundaries between portions 1, 2, and 12 in relation to the estimated maximum temperature point.

In a practical case, assuming that the electrical current will come to the electromechanical switch through electric cables coupled to, for example, Faston connectors connected to the metallic terminals 5a and 5b attached to portions 2 and 12, and taking into account also the geometry of said Faston connectors, a distance of ±5 mm from the hottest point, i.e. from the end of the connector 5a and 5b nailed into the portion 2 and 12, is adequate for dimensioning said portions 2 and 12. In other words, if each of the connectors 5a and 5b is symmetrically attached to the respective portion 2 and 12, a thickness of 5 mm and a width of 10 mm is determined to be appropriate, where said width refers to the dimension in the direction of the electrical path to be selectively connected between two opposed connectors 5a and 5b. If said distances were lower than the determined as appropriate, then the plastic selected for portions 1 should be selected to withstand a higher temperature, and then its cost would increase. The above appropriate distance values have been confirmed to be valid for all the embodiments of the support illustrated in the appended figures, by means of corresponding empiric tests.

Regarding the plastics selection, from the above analysis, it has been concluded that for an embodiment of the support of the third aspect of the invention using a bimaterial configuration, Polyamide (PA) standard is perfectly suitable for use in areas of lower temperature requirements, i.e. for second portion 1, since the softening temperature is, depending on the specific types of Polyamide, of between 200° C. and 250° C., which gives an adequate safety coefficient for normal operation with a reserve sufficient for abnormal operation for a limited time, even for the boundary regions, i.e. even for the joining regions of second portion 1 with first portion 2 or with third portion 12. For those areas of higher temperature requirements, i.e. for portions 2 and 12, Poliphtalamide type thermoplastics can be selected, as they have a softening temperature of between around 300° C. and 350° C., depending on the type of Poliphtalamide, which offers excellent performance guarantee in all conditions.

A person skilled in the art could introduce changes and modifications in the embodiments described without departing from the scope of the invention as it is defined in the attached claims.

What is claimed is:

1. An electromechanical switch, comprising:
   an electrically insulating support for an electromechanical switch, wherein the electrically insulating support is constituted as a single piece comprising a first portion made of a first plastic having a first temperature heat resistance, and a second portion made of a second plastic having a second temperature heat resistance, said first temperature heat resistance being higher than said second temperature heat resistance, wherein at least said second plastic is a thermoplastic, wherein at least one of:
   said second portion is overmolded over at least some regions of said first portion, or vice versa; and
   said first and second portions, and/or other portions of the electrically insulating support also having different temperature heat resistances, are manufactured and joined simultaneously by a multi-material injection process; and
   at least a first, a second and a third electrically conductive elements configured and arranged such that the third electrically conductive element selectively connects the first and second electrically conductive elements, wherein the first and the second electrically conductive elements are attached respectively to:
   two separated regions of said first portion which are either at least one of:
   distanced by said second portion which is overmolded over at least some regions of the first portion, or vice versa, wherein the second portion includes at least a central region acting as a bridge between said two separated regions of said first portion; and joined by said second portion which is injection molded to said two separated regions of the first portion by means of said multi-material injection process, wherein the second portion includes at least a central region acting as a bridge between said two separated regions of said first portion; or one to the first portion and the other to a third portion made of a plastic having a third temperature heat resistance higher than the second temperature heat resistance, said first and third portions being distanced by the second portion, wherein the second portion includes at least a central region acting as a bridge between said first and third portions.

2. The electromechanical switch according to claim 1, configured, arranged and adapted for low or medium voltage applications.

3. The electromechanical switch according to claim 1, configured, arranged and adapted for withstanding a high number of switching actions per use of the electrical circuit into which is interconnected.

4. The electromechanical switch according to claim 1, configured, arranged and adapted for being connected into an electrical circuit of a household electrical appliance.

5. The electromechanical switch according to claim 1, wherein the electromechanical switch is a manual switch and/or an automatic switch.

6. The electromechanical switch according to claim 1, wherein said third electrically conductive element is not connected to said second portion.

7. The electromechanical switch according to claim 1, wherein the configuration, dimensions, and spatial arrangement of said first and second portions, or of said first, second, and third portions, with respect to each other, is selected based on thermal conduction heat transfer criteria, specifically based on an estimation of heat distribution, in magnitude and direction, from the hottest points of said portions in contact with the first and the second electrically conductive elements, which when in use are caused by the circulation of electrical current therethrough, towards said second portion.

* * * * *